United States Patent [19]

Wehrmann et al.

[11] Patent Number: 5,368,968
[45] Date of Patent: Nov. 29, 1994

[54] MODIFIED POLYESTER RESINS, A PROCESS FOR THEIR PREPARATION AND TONERS CONTAINING SUCH POLYESTER RESINS

[75] Inventors: Rolf Wehrmann, Krefeld; Matthias Köcher, Overath, both of Germany; Harald Pielartzik, Pittsburgh, Pa.; Günter Klug, Monheim, Germany

[73] Assignee: Bayer Aktiengesellschaft, Leverkusen, Germany

[21] Appl. No.: 800,196

[22] Filed: Nov. 27, 1991

[30] Foreign Application Priority Data

Dec. 22, 1990 [DE] Germany .................. 4041520

[51] Int. Cl.$^5$ ............................................. G03G 9/083
[52] U.S. Cl. ............................ 430/106.6; 528/272; 528/274; 528/296; 528/302; 528/303; 528/307; 528/308; 528/308.6; 525/437; 525/444; 525/445; 525/448; 525/450; 430/109
[58] Field of Search ............... 528/272, 274, 296, 302, 528/303, 307, 308, 308.6; 525/437, 444, 445, 448, 450; 430/106.6, 109

[56] References Cited

U.S. PATENT DOCUMENTS

| | | | |
|---|---|---|---|
| Re. 32,136 | 5/1986 | Sandhu et al. | 528/302 |
| 3,477,989 | 11/1969 | Zorn et al. | 528/193 |
| 4,416,965 | 11/1983 | Sandhu et al. | 430/109 |
| 4,622,268 | 11/1986 | Yatsu et al. | 428/480 |
| 4,672,086 | 6/1987 | Seiler et al. | 524/127 |
| 4,772,652 | 9/1988 | Yoshifumi et al. | 524/394 |

FOREIGN PATENT DOCUMENTS 0276874 8/1988 European Pat. Off.
0374716 6/1990 European Pat. Off.

OTHER PUBLICATIONS

World Patents Index Latest, Week 8932.

*Primary Examiner*—Samuel A. Acquah
*Attorney, Agent, or Firm*—Sprung Horn Kramer & Woods

[57] ABSTRACT

Modified polyester resins contain polyester blocks which have been obtained from dicarboxylic acids and dialcohols, groupings of the formulae

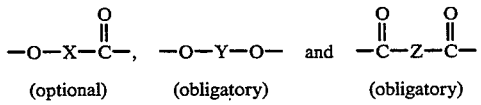

where X=Z=a hydrocarbon radical having 1 to 20 C atoms and Y=a hydrocarbon radical having 2 to 25 C atoms, and if appropriate groupings originating from crosslinking agents. They can be used as base polymers for toners.

5 Claims, No Drawings

MODIFIED POLYESTER RESINS, A PROCESS FOR THEIR PREPARATION AND TONERS CONTAINING SUCH POLYESTER RESINS

The present invention relates to new modified polyester resins, a process for their preparation from polyesters which have been obtained from aromatic dicarboxylic acids and dialcohols, and toners which contain such modified polyester resins as base polymers or toner resins.

It is known that resins based on polyesters which are not built up in the form of blocks and do not contain component b) according to the invention have hitherto been used as toner resins (see U.S. Pat. No. 4,891,293, European Published Specification 291,059 and European Published Specification 333,498), the combinations of the various properties in these polyesters not yet being optimum.

The reaction of polyalkylene terephthalates with only acetoxybenzoic acid is furthermore known (see J. Polym. Sci. Chem. Ed., 14, 2043 (1976) and U.S. Pat. No. 3,288,755). The aim of the work was to increase the glass transition temperature and the heat distortion point and improve the flameproofing by the increased content of aromatic units. At the same time, a higher level of mechanical properties was to be achieved, and the good theological properties of liquid crystalline polyesters were to be obtained. The products thus obtainable are construction materials. Because of their physico-chemical properties, especially because of their high melting points, they are not suitable for use as base polymers in toners.

Modified polyester resins have now been found, which are characterised in that they contain a) 1 to 99% by weight of one or more polyester blocks which have been obtained from dicarboxylic acids and dialcohols, b) 0 to 60% by weight of groupings of the formula (I)

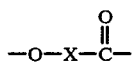   (I)

in which
X represents a hydrocarbon radical having 1 to 20 C atoms, c) 1 to 99% by weight of a mixture of
c1) 40 to 60 mol % of groupings of the formula (II)

—O—Y—O—   (II)

in which
Y represents a hydrocarbon radical having 2 to 25 C atoms and c2) 40 to 60 mol % of groupings of the formula (III)

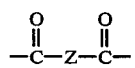   (III)

which
Z represents a hydrocarbon radical having 1 to 20 C atoms and d) 0 to 10% by weight of groupings originating from crosslinking agents which are trifunctional or more than trifunctional.

Components a), b), c) and d) add up to 100% by weight and components c1) and c2) add up to 100 mol % of c).

The modified polyester resins according to the invention preferably contain
5 to 80% by weight of component a),
0.1 to 50% by weight of component b),
to 80% by weight of component c) and/or
0 to 8% by weight of component d),
these components adding up to 100% by weight.

Component a) preferably consists of one or more polyester blocks which have been obtained from one or more $C_6$- to $C_{10}$-aromatic dicarboxylic acids, in particular iso- and/or terephthalic acid, and one or more dialcohols chosen from the group comprising aliphatic dialcohols having 2 to 10 C atoms and cycloaliphatic dialcohols having 5 to 7 C atoms. Component a) particularly preferably consists of a polyester block which has been obtained from terephthalic acid and ethanediol and/or 1,4-butanediol.

Component b) is derived formally from a hydroxycarboxylic acid having 2 to 21 C atoms. In formula (I), X preferably represents an aromatic radical having 6 to 10 C atoms, in particular a phenyl or naphthyl radical. Component b) is particularly preferably derived formally from salicylic acid, p-hydroxybenzoic acid or 2,6-hydroxynaphthalenecarboxylic acid.

Component c) is derived formally from a mixture of a diol (c1) and a dicarboxylic acid (c2). The radical Y in formula (II) can be, for example, an aliphatic, cycloaliphatic, optionally polynuclear aromatic or araliphatic radical, or mixtures thereof. The radical Y can also contain hetero atoms, for example oxygen, sulphur and/or nitrogen atoms. Component c1) is preferably derived from ethanediol, propanediol, butanediol, hexanediol, decanediol, neopentylglycol, cyclohexanedimethanol, 2,2'-di-(4-hydroxycyclohexyl)-propane, bisalkoxylated bisphenol A (in which the particular alkoxide used has contained, for example, 2 to 6 C atoms, preferably 2 or 3 C atoms), hydroquinone, resorcinol, bisphenol A, bis-(hydroxyphenyl)-alkanes, -cycloalkanes, sulphides, ethers, ketones, sulphones or sulphoxides, $\alpha,\alpha'$-bis-(hydroxyphenyl)-diisopropylbenzenes and corresponding nuclear-alkylated and/or nuclear-halogenated aromatic diols. Particular examples of aromatic diols are those having 12 to 22 C atoms, such as 4,4-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, $\alpha,\alpha'$-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-cyclohexane, $\alpha,\alpha'$-bis-(3,5-dimethyl-4-hydroxyphenyl)-p-diisopropylbenzene, 2,2-bis-(3,5-dichloro-4-hydroxyphenyl)-propane, 2,4-bis-(3,5-dibromo-4-hydroxyphenyl)propane and 4,4'-dihydroxydiphenyl sulphone.

Component c1) can also be derived from a dihydroxydiphenylcycloalkane of the formula (IV)

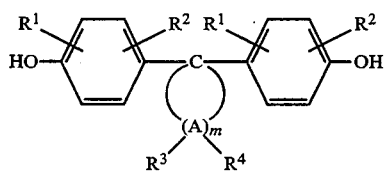

in which
R¹ and R² independently of one another denote hydrogen, halogen, $C_1$- to $C_8$-alkyl, $C_5$- to $C_6$-cycloalkyl, $C_6$- to $C_{10}$-aryl or $C_7$- to $C_{12}$-aralkyl, m denotes an integer from 4 to 7, R³ and R⁴ can be chosen individually for each A and independently of one another denote hydrogen or $C_1$- to $C_6$-alkyl and A denotes carbon, in particular from 1,1-bis-(4-hydroxyphenyl)-3,3,5-trimethylcyclohexane, or from dianol-2,2-dianol-3,3 or a diol of the formula (V)

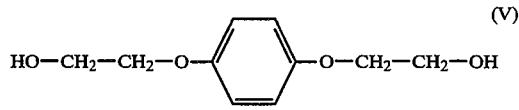

or from ethoxylated and/or propoxylated derivatives of dihydroxydiphenylcycloalkanes of the formula (IV).

Component c1) can furthermore be derived from alkylene ether glycols, such as diethylene glycol, triethylene glycol, polyethylene glycol, polytetramethylene ether glycol and polypropylenetetramethylene ether glycol, alicyclic diols, such as hydrogenated bisphenol A, and aromatic diols, such as polyoxypropylene(2,3)-2,2-bis-(4-hydroxyphenol)-propane, polyoxyethylene(2,0)-2,2-bis-(4-hydroxyphenyl)-propane and polyoxypropylene-p-hydroxybenzenes, and from 1,7-heptanediol, 1,8-octanediol, 1,9-nonanediol, 2,4-dimethyl-2-ethylhexane-1,3-diol, 2-ethyl-2-butyl-1,3-propanediol, 2-ethyl-2-isobutyl-1,3-propanediol, 3-methyl-1,5-pentanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol, 4,4'-thiodiphenol, 4,4'-methylenediphenol, 4,4'-(2-norbonylidene)-diphenol, 4,4'-isopropylidenediphenol, 4,4'-isopropylidene-bis(2,-6dichlorophenol), 2,5-naphthalenediol, p-xylylenediol, cyclopentane-1,2-diol, cyclohexane-1,3-diol and cyclohexane-1,4-diol.

Component c2) is derived formally from a dicarboxylic acid having 3 to 22 C atoms. The radical Z in formula (III) can be, for example, an aliphatic, cycloaliphatic, optionally polynuclear aromatic or araliphatic radical or mixtures thereof. The radical Z can also be unsaturated. Component c2) can be derived formally, for example, from aliphatic dicarboxylic acids having 3 to 10 C atoms, from cycloaliphatic dicarboxylic acids having 7 to 9 C atoms, from aromatic dicarboxylic acids having 8 to 12 C atoms or from unsaturated aliphatic dicarboxylic acids having 4 to 6 C atoms. Component c2) is particularly preferably derived formally from succinic acid, adipic acid, sebacic acid, azelaic acid, maleic acid, fu/naric acid, cyclohexanedicarboxylic acid, phthalic acid, isophthalic acid or terephthalic acid.

Component c2) can also be derived formally from 1,2-propanedicarboxylic acid, 1,3-butanedicarboxylic acid, 2,3-butanedicarboxylic acid, 3-methyl-glutaric acid, 2,2-dimethyl-1,3-propanedicarboxylic acid, 1,2-dimethyl-1,3-propanedicarboxylic acid, 1,3-dimethyl-1,3-propanedicarboxylic acid, 1,2,3-trimethyl-1,3-propanedicarboxylic acid, 2,3-dimethyl-1,4-butanedicarboxylic acid, 3,3-diethyl-1,5-pentanedicarboxylic acid, malonic acid, glutaric acid, alicyclic dicarboxylic acids, such as cyclohexanedicarboxylic acid, aromatic dicarboxylic acids, such as 3,5-toluenedicarboxylic acid, 2,4-toluenedicarboxylic acid, 2,5-toluenedicarboxylic acid and naphthalene-dicarboxylic acids, and furthermore from the anhydrides and alkyl esters of the above dicarboxylic acids. Component d) can be derived formally, for example, from an alcohol which is trifunctional or more than trifunctional and/or a carboxylic acid which is trifunctional or more than trifunctional. In both cases the functionality can be, for example, 3 to 6. Component d) is preferably derived formally from glycerol, trimethylolpropane, pentaerythritol, trimellitic acid or pyromellitic acid.

Component d) can furthermore be derived formally from trimellitic anhydride, pyromellitic anhydride, 4-methylcyclohexane-1,2,3-tricarboxylic anhydride, trimesic acid and 5-(2,5-dioxotetrahydrofurfuryl)-3-methyl-3-cyclohexene-1,2-dicarboxylic anhydride, as well as from hydroxyterephthalic acid, resorcylic acid and hydroxycarboxylic acids which are difunctional or more than difunctional.

The present invention furthermore relates to a process for the preparation of modified polyester resins from a polyester or a polyester mixture obtained from dicarboxylic acids and dialcohols, which is characterised in that a) 1 to 99% by weight of the polyester or polyester mixture is reacted with b) 0 to 60% by weight of a hydroxycarboxylic acid having 2 to 21 C atoms or a derivative thereof, c) 1 to 99% by weight of a mixture of c1) 40 to 60 mol % of a diol having 2 to 25 C atoms and c2) 40 to 60 mol % of a dicarboxylic acid having 3 to 22 C atoms, or a derivative thereof, and d) 0 to 10% by weight of a crosslinking agent, at temperatures in the range from 130° to 350° C. and if appropriate in the presence of transesterification catalysts. Components a) to d) give 100% by weight, and components c1) and c2) give 100 mol % of c).

Preferably, 5 to 80% by weight of component a), 0.1 to 50% by weight of component b), 5 to 80% by weight of component c) and/or 0 to 8% by weight of component d)

are employed.

Components a) which are suitable for the process according to the invention can be obtained, for example, as commercial products from the most diverse manufacturers, or can be prepared from dicarboxylic acids and dialcohols by known processes. Those dicarboxylic acids and dialcohols which are mentioned as preferred and particularly preferred in the description of component a) of the modified polyester resins according to the invention are preferred here (for details, see above).

Components b) which are suitable for the process according to the invention are preferably aromatic hydroxycarboxylic acids having 7 to 11 C atoms in total. Salicylic acid and p-hydroxybenzoic acid are particularly preferred. Examples of suitable derivatives of hydroxycarboxylic acids are $C_1$- to $C_4$-acyloxy-carboxylic acids, in particular $C_2$- and $C_3$-acyloxycarboxylic acids.

Of the hydroxycarboxylic acid derivatives, p-acetoxybenzoic acid is preferred. If appropriate, hydroxycarboxylic acid derivatives can be prepared in a step prior to the actual process according to the invention. For example, an acyloxybenzoic acid can thus be obtained from the corresponding hydroxybenzoic acid and the corresponding anhydride, for example acetic anhydride. Salicylic acid, p-hydroxybenzoic acid or 2,6-hydroxynaphthalenecarboxylic acid are preferably employed.

Components c1) which are suitable for the process according to the invention are, for example and preferably, those diols from which component c1) of the modified polyester resins according to the invention can be, for example and preferably, formally derived (for details, see above).

Components c2) which are suitable for the process according to the invention are, for example and preferably, those dicarboxylic acids from which component c2) of the modified polyester resins according to the invention can be, for example and preferably, formally derived (for details, see above). Possible dicarboxylic acid derivatives are, for example, anhydrides and esters of these dicarboxylic acids. Examples which may be mentioned are maleic anhydride, phthalic anhydride, esters thereof with $C_1$- to $C_4$-alcohols and such esters of terephthalic, isophthalic, adipic, sebacic and cyclohexanedicarboxylic acid.

Components d) which are suitable for the process according to the invention are, for example and preferably, those alcohols and carboxylic acids which are trifunctional or more than trifunctional and from which component d) of the modified polyester resins according to the invention can be, for example and preferably, formally derived (for details, see above).

Preferred temperatures for the process according to the invention are 150° to 300° C., in particular 180° to 280° C. It may be advantageous to start the process according to the invention at relatively low temperatures, for example at 130° to 220° C., and to end it at relatively high temperatures, for example at 250° to 350° C.

In principle, the process according to the invention can be carried out under any desired pressures. The pressure is preferably chosen so that low molecular weight byproducts which forth, for example water, acids and/or alcohols, escape from the reaction mixture in gaseous form at the particular prevailing temperature. Pressures in the range from 1 mbar to 2 bar, in particular those from 5 mbar to 1 bar, are often suitable for this purpose. It may be advantageous to start the process according to the invention under a relatively high pressure, for example under normal pressure, and to reduce the pressure during the process, for example down to 5 to 20 mbar.

The reaction time for the process according to the invention can be, for example, between 1 hour and 20 hours.

Possible transesterification catalysts to be employed if appropriate are the catalysts known for transesterification purposes, such as titanium alcohols, antimony trioxide, germanium acetate, magnesium acetate, p-toluenesulphonic or mineral acids, it also being possible for these to be formed in situ, for example magnesium acetate from elemental magnesium and acetic acid. The process according to the invention is preferably carried out in the presence of less than 1% by weight of transesterification catalyst, based on the entire reaction mixture.

The modified polyester resins obtainable after carrying out the process according to the invention in general have molecular weights of between 1000 and 50,000 (determined by the gel permeation chromatography method using methylene chloride as the solvent and by calibration with polystyrene).

The present invention furthermore relates to toners, which are characterised in that they contain the modified polyester resins described above as base poisoners.

Toners are used in the development of electrostatic charge images, for example in electrophotography, electrography and ionography, and in the development of magnetostatic charge images in magnetography.

Of these processes, electrophotography (see, for example, U.S. Pat. No. 2,297,691, U.S. Pat. No. 3,666,363 and U.S. Pat. No. 4,071,361) has achieved the greatest importance by far. In electrophotography, a virtual image is produced in the form of electrostatic charges on a photoconductor by exposure of the original to light or conversion of digitalised image information with the aid of a laser, an LED array or an LCS unit. This charge image of the photoconductor on the surface of a rotating drum is developed by contact with a toner. The toner which builds up the image is transferred by a driving potential from the surface of the photoconductor to the carrier material (for example paper or film) and fixed there.

The charge image can be developed on the surface of the photoconductor by 2 methods, the one-component or the two-component process.

In the two-component process (see, for example, U.S. Pat. No. 2,874,063), toner particles having a particle size of, for example, 5 to 30 μm and comprising a base polymer (for example 70 to 95% by weight), one or more pigments (for example 3 to 20% by weight) and if appropriate other additives, are charged triboelectrically by mechanical agitation with magnetic carrier particles of a particle size of, for example, 30 to 200 μm (for example iron, coated iron or ferrites) and in this way form a layer on the surface of the oppositely charged carrier particles. The carrier particles are then aligned radially on a rotating roll with the aid of a magnetic field and are brought into permanent contact with the similarly rotating photoconductor. The toner particles adhering to the carrier particles are transferred to the oppositely charged areas corresponding to the virtual charge image.

In the one-component process (see, for example, U.S. Pat. No. 3,909,258), carrier-toner hybrid particles having a particle size of, for example, 5 to 30 μm and comprising for example 20 to 70% by weight of magnetic pigments, for example 25 to 65% by weight of base polymer and if appropriate also additional additives are used as the toner. In this case, the toner is precharged electrically or triboelectrically and brought spacially close to the photoconductor by a radially orientated magnetic field on the surface of a rotating cylinder. The toner particles are then transferred to the charged areas corresponding to the virtual charge image.

There are also other development techniques (see, for example, U.S. Pat. No. 2,618,552 and U.S. Pat. No. 2,221,776), but these have not found the same degree of acceptance in practice.

The image quality of the reproduction always depends in a decisive manner on the properties of the toner.

Two techniques have found acceptance in practice for fixing the toner transferred to the carrier material, that is to say flash fixing and hot roller fixing.

Flash fixing is based on a fast, contactless heating up of the toner on the carrier material by means of a flash lamp, the toner fusing into the surface of the carrier material.

Hot roller fixing is used specifically in high-performance copiers and compact systems (for example laser printers and desk-top copiers). In this process, the carrier material with the adhering toner is brought into contact with a heated roller which bonds the toner permanently to the surface of the carrier material under pressure and heat.

The product requirements of these two fixing techniques differ widely.

For flash fixing, a low melting point and a large reduction in viscosity as the temperature rises are necessary in order to keep the amount of energy required for the melting operation as low as possible. However, it is not possible for any low melting point of the base polymer in the toner to be chosen, since trouble-free development is ensured only with base polymers which have glass transition temperatures above 40° C., in particular above 55° C.

In the case of hot roller fixing, as well as a relatively low softening point, a small reduction in the viscosity as the temperature rises is required. In the case of too pronounced a drop in the viscosity, a lack of elasticity of the melt and/or low adhesiveness with respect to the roller material, so-called "hot offset" occurs, that is to say toner material sticks to the fixing roller. The interval between the lowest possible fixing temperature and the temperature at which "hot offset" starts—the so-called fixing window—should be as wide as possible. If appropriate, the fixing window can be extended by specific additives (for example polyolefin waxes), which are added to the toner in amounts of, for example, up to 5% by weight, preferably in amounts of 2 to 3% by weight.

The fixing properties of toners are determined decisively by the base polymer used, which is also called the toner resin. In addition, the mechanical properties, glass transition temperature and properties important for the toner preparation process (for example grindability, free-flowing characteristics of the toner, dispersion capacity for pigments) are also greatly influenced by the base polymer.

Base polymers for toners and toner resins must therefore combine a large number of properties. The toners according to the invention which contain specifically modified polyester resins as the base polymer meet the requirements profile of toners in an outstanding manner.

They can also be adapted to suit particular processes (for example particular development and/or fixing processes) by variation of the individual components and their quantitative mixture.

In addition to the modified polyester resins which are essential in the context of the present invention, toners according to the invention can contain customary additives in the customary amounts (for example 5 to 10% by weight of pigments, such as, for example, carbon black, 0.5 to 3% by weight of additives for increasing the fixing window, 0.5 to 3% by weight of charge control substances and, in the case of one-component toners, for example 20 to 60% by weight of magnetic pigments, such as Bayferrox ® 8600 or 8610).

The toners according to the invention are distinguished in particular by the fact that their base polymer or toner resin has a relatively high glass transition temperature (for example in the range from 40° to 80° C.), a relatively low softening point and good rheological properties. The polyester resins according to the invention are not sensitive to plasticisers (such as are contained, for example, in transparent envelopes made of polyvinyl chloride for use with written material), have a good dispersion capacity for magnetic pigments and other additives, have a high transparency (especially necessary for colour copies), have a good penetration capacity into the surface of paper, can easily be ground and give toners with good charging characteristics (for example good long-term stabilities and good independence from climatic influences), good adhesiveness with respect to the roll materials employed in hot roller fixing and excellent "hot offset" resistance. Fixer additives can therefore often be dispensed with, or they can be employed in lower amounts than are customary. Toners according to the invention are also particularly suitable for high-speed copying systems and the flash fixing method.

EXAMPLES

General

Components a), if appropriate b), c1), c2) and if appropriate d) were mixed in the amounts stated in the table together with in each case 0.03 g of Mg powder in a reaction vessel which could be evacuated, and the mixture was first heated at 280° C. under normal pressure for 1 hour. The reaction mixture was then heated at 280° C. under 300 mbar for 3 hours and subsequently kept at 280° C. under 10 mbar for a further hour (in each case the bath temperature).

The glass transition temperature $T_g$ was determined by differential thermoanalysis (DSC) for the product obtained in each case. The temperatures shown in the Table relate to the second heating up. The viscosity was furthermore determined using a Shimadzu Flowtester CFT-500. The pressing pressure was 100 kg, the stamp had an area of 1 cm$^2$, the nozzle had a length of 10 mm and a diameter of 1 mm and the test specimen weighed 1.5 g. The heating up rate was 6° C./minute.

The abbreviations used in the table have the following meanings:

PET=polyethylene terephthalate having an intrinsic viscosity of 1.0 to 1.3 dl/g, measured in phenol/o-dichlorobenzene (1:1 parts by weight) at 25° C. in an Ubbelohe viscometer.

PBT=polybutylene terephthalate having an intrinsic viscosity of 1.0 to 1.3 dl/g, measured in phenol/o-dichlorobenzene (1:1 parts by weight) at 25° C. in an Ubbelohe viscometer.

IPA=isophthalic acid
TPA=terephthalic acid
TMA=trimellitic anhydride
TMP=trimethylolpropane
p-Acetoxybenzoic acid was used as component b) and 2,2-bis(4-hydroxy-ethoxy-phenyl)-propane was used as component c1).

|   | | Starting materials; component x in g | | | Product properties | |
|---|---|---|---|---|---|---|
| Ex. No. | a) | b) | c1) | c2) | d) | Tg (°C.) | Viscosity in Pa · s/ at °C. |
| 1 | PET 100 | 20 | 118.03 | TPA 61.98 | — | 60 | 3700/100 |
| 2 | PBT 150 | 15 | 103.9 | TPA 51.83 | — | 53 | 9000/80 |
| 3 | PET 150 | 15 | 98.7 | TPA 51.83 | — | 70 | 6500/100 |
| 4 | PBT 150 | 15 | 98.7 | IPA 51.83 | — | 49 | 8000/100 |
| 5 | PBT 150 | 15 | 98.7 | TPA 51.83 | — | 54 | 30000/80 |
| 6 | PET 100 | 20 | 118.03 | TPA 61.98 | — | 73 | 24700/100 |
| 7 | PBT 150 | 37.5 | 73.77 | TPA 38.73 | — | 71 | 14000/100 |
| 8 | PET 150 | 15 | 88.28 | TPA 44.04 | TMA 2.68 | 73 | 79000/100 |
| 9 | PET 150 | 15 | 85.71 | TPA 47.83 | TMP 1.91 | 74 | 75000/100 |
| 10 | PET + PBT each 315 | 27 | 159.34 | TPA 83.67 | — | 55 | 12000/100 |
| 11 | PET 150 | 15 | 79.65 | TPA 49.24 | TMP 6.14 | 77 | 10200/120 |
| 12 | PET 90 | 63 | 96.39 | TPA 50.61 | — | 71 | 52500/100 |
| 13 | PBT 90 | 63 | 96.39 | TPA 50.61 | — | 58 | 2700/100 |
| 14 | PET 210 | 22.5 | 44.26 | IPA 23.24 | — | 72 | 2400/100 |
| 15 | PET 441 + PBT 189 | 54 | 142.36 | TPA 73.63 | — | 61 | 11400/100 |
| 16 | PET 378 + PBT 252 | 54 | 142.36 | TPA 73.63 | — | 59 | 7700/100 |
| 17 | PET 441 + PBT 189 | 27 | 159.34 | TPA 83.67 | — | 64 | 31400/100 |
| 18 | PET 247.4 + PBT 106 | — | 79.87 | TPA 41.31 | — | 66 | 2500/120 |
| 19 | PET 247.4 + PBT 106 | 30.29 | 78.87 | TPA 37.18 + IPA 4.13 | — | 60 | 6200/100 |

EXAMPLE 20

93 g of the modified polyester obtained according to Example 15 were kneaded with 7 g of Spezialschwarz 4 (Degussa) and 3 g of polypropylene wax (type as in Example 24) at 150° C. A toner was obtained after comminution in a vibratory mill, grinding in a jet mill and subsequent sifting to an average particle diameter of 15 μm. This had a charge of −10.5 μC/g with respect to a noncoated iron carrier. An equipment test demonstrated the long-term stability of the charge under conditions in practice (−10.1 μC/g after 50,000 copies). Fixing with a hot roller system was already possible at low temperatures. The copies showed outstanding adhesion of the toner to the paper (more than 95%). No "hot offset" occurred. A good adhesion was also obtained if a film was used as the carrier medium.

EXAMPLE 21

A toner was prepared analogously to Example 20 using the modified polyester prepared according to Example 19. This showed a triboelectric charge of −15.3 μC/g with respect to a noncoated iron carrier. An equipment test demonstrated the long-term stability of the charge under conditions in practice (−14.5 μC/g after 50,000 copies). Fixing with a hot roller apparatus was already possible at low temperatures. The copies showed outstanding adhesion of the toner to the paper (more than 97%).

EXAMPLE 22

93 g of the modified polyester obtained according to Example 1 were kneaded with 7 g of Spezialschwarz 4 (Degussa) at 150° C. A toner which displayed a triboelectric charge of −8.5 μC/g was obtained after comminution in a vibratory mill, grinding in a jet mill and subsequent sifting to an average diameter of 50 μm. An equipment test demonstrated the long-term stability of the charge under conditions in practice (−8.0 μC/g after 50,000 copies). The flash fixing used gave copies with excellent adhesion.

EXAMPLE 23

The preparation of a toner analogously to Example 22 using the modified polyester prepared according to Example 11 gave a toner having a triboelectric charge of −16.4 μC/g. An equipment test demonstrated the long-term stability of the charge under conditions in practice (−15.9 μC/g after 50,000 copies). Fixing with a hot roll system was already possible at low temperatures. It was not necessary to use polypropylene wax to avoid "hot offset", since this toner already exhibited an outstanding hot offset resistance, that is to say had a broad so-called fixing window, without additives.

EXAMPLE 24

93 g of the modified polyester obtained according to Example 17 were kneaded with 7 g of Spezialschwarz 4 (Degussa), 3 g of polypropylene wax (Viscol ® 550 P from Sanyo) and 60 g of ferrite (Bayferrox ® 8600) at 150° C. A toner which displayed a triboelectric charge of −5.4 μC/g was obtained after comminution in a vibratory mill, grinding in a jet mill and subsequent sifting to an average diameter of 15 μm. An equipment test demonstrated a good performance under conditions in practice (longterm stability of the charge: −5.3 μC/g after 50,000 copies; adhesion: more than 97%). An electron microscopy examination showed an excellent dispersion of the magnetic pigment in the toner.

What is claimed is:

1. Toner for use in the development of electrostatic-charge images and magnetostatic-charge images comprising a base polymer and one or more pigments wherein the base polymer is a reaction product of a) 1 to 99% by weight of one or more polyester blocks which have been obtained from dicarboxylic acids and dialcohols.

b) 0 to 60% by weight of compounds introducing into the reaction product groupings of the formula

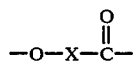

(I)

in which

X represents a hydrocarbon radical having 1 to 20 C atoms, c) 1 to 99% by weight of a mixture of c1) 40 to 60 mol-% of compounds introducing into the reaction product groupings of the formula (II)

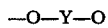   (II)

in which

Y represents an aliphatic, cycloaliphatic or araliphatic hydrocarbon radical having 2 to 25 C atoms, and c2) 40 to 60 mol-% of compounds introducing into the reaction product groupings of the formula (III)

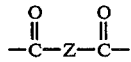   (III)

which

Z represents a hydrocarbon radical having 1 to 20 C atoms, and d) 0 to 10% by weight of crosslinking agents which are trifunctional or more than trifunctional, components a), b), c) and d) adding up to 100% by weight, and components c1) and c2) adding up to 100 mol-% of c).

2. Toner according to claim 1 wherein c1) is 2.2-bis-(4-hydroxy-ethoxy-phenyl)-propane and compound c2) is isophthalic acid or terephthalic acid.

3. Toner according to claim 1 wherein compound a) is polyethylene terephthalate or polybutylene terephthalate.

4. Toner according to claim 1 comprising 70 to 95% by weight of the base polymer and 3 to 20% by weight of one or more pigments.

5. Toner according to claim 1 comprising 25 to 65% by weight of the base polymer and 20 to 70% by weight of magnetic pigments.

* * * * *